United States Patent Office 3,002,990
Patented Oct. 3, 1961

3,002,990
REACTION OF CYANOGEN CHLORIDE WITH CARBOXYLIC ACIDS AND ANHYDRIDES THEREOF
James E. Longfield, Stamford, and James K. Dixon, Riverside, Conn., assignors to American Cyanamid Company, New York, N.Y., a corporation of Maine
No Drawing. Filed Mar. 29, 1957, Ser. No. 649,324
9 Claims. (Cl. 260—465)

This invention relates to the preparation of nitriles and, more particularly, to a method for producing nitriles in the vapor phase from cyanogen halide and a carboxylic acid or acid anhydride.

It has been recently proposed that nitriles may be prepared by reacting the alkali metal salts of carboxylic acids with cyanogen chloride in the liquid phase to obtain a mixture comprising the corresponding nitrile of the carboxylic acid. In view of the fact that the reaction is carried out in the liquid phase, elevated temperatures above 300° C. could not be employed, for otherwise the products formed would tend to decompose. Nonetheless, a process which could be used to form nitriles at temperatures above 300° C. would be highly advantageous because at such elevated temperatures, the time of reaction could be substantially shortened.

It is an object of the present invention to provide a process whereby nitriles are formed swiftly in the vapor state. It is a further object of the invention to employ a variety of carboxylic acids and cyanogen halide for purposes of forming nitriles in the vapor phase.

It has been found, according to the present invention, that when cyanogen halide, such as cyanogen chloride or cyanogen bromide, is admixed with a carboxylic acid and heated to a temperature of about 400° C. or higher, reaction is rapid. A gas mixture is quickly formed. This mixture is removed from the heated reaction zone and condensed. Recovery of the desired nitrile from the condensate is then achieved by methods well known in the art, as for example by fractional distillation.

As a starting material, the acid may be reacted per se. Alternatively, it may be admixed with an inert solvent prior to reaction. Such solvent includes, for example, benzene or dioxane.

Any of a variety of carboxylic acids may be employed. Typical acids are, for example, aliphatic acids such as acetic acid, propionic acid, butyric acid, oxalic acid and citric acid; aromatic acids such as benzoic acid and toluic acid; araliphatic acids such as phenylacetic acid; hydrophenanthrene acids such as abietic acid, tall oil rosin acids, tall oil fatty acids; their anhydrides and mixtures of the same such as tall oil.

According to the stoichiometry of the process of the invention, when the reactants are monocarboxylic acid and cyanogen chloride, one mol of the carboxylic acid per mol of cyanogen chloride is required for reaction. However, an excess of carboxylic acid, usually up to about four mols, will cause the reaction to proceed with greater ease. When a dicarboxylic or tricarboxylic acid is the reactant, a quantity of at least two or three mols, respectively, of cyanogen chloride per mol of corresponding acid is employed.

If desired, the reactants may be preheated prior to reaction, usually at temperatures below 300° C. However, the temperature of reaction may be varied over a considerably wide range. In practice, the range used will be from about 400° C. to about 700° C. Temperatures substantially lower than 400° C. do not result in the adequate production of nitriles. For example, at 300° C., nitrile formation does not seem to occur and between 300° C. and 400° C. only trace quantities are detected. However, unduly elevated temperatures not only result in excessive power consumption but also involve more care and expense for thermal insulation of the equipment. Therefore, temperatures above 700° C., although operative, do not apparently produce sufficiently improved results in most cases to warrant their use.

As stated above, when the reactants are so treated in accordance with the process of the invention, the reaction between the carboxylic acid and cyanogen halide is a rapid one. The time of contact may be varied from about a second to about a minute. In general, it has been found that a contact time of from five to ten seconds is entirely satisfactory when operating within the temperature range of from about 400° C. to about 600° C.

Any suitable thermally-insulated, corrosion-resistant reactor may be used. For example, Pyrex glass or a quartz may be used advantageously either to form the vessel or as a lining. The reaction space may or may not be packed with quartz chips, activated charcoal or the like. Where the chamber is packed, the time of contact may be somewhat reduced.

For a clearer understanding of the invention, the following examples set forth the more specific factors which are illustrative only and are not to be construed as being limitative.

Example 1

Acetic acid and cyanogen chloride in a mol ratio of two to one, respectively, are mixed and reacted in a quartz tube at a temperature of 500° C. The time of contact during reaction is 7.8 seconds. The evolved off-gas is then cooled to room temperature to condense the same. The latter is subjected to fractional distillation. The yield of acetonitrile (B.P. 82° C.) based on the consumed cyanogen chloride is 20%.

Example 2

Acetic anhydride and cyanogen chloride in a mol ratio of two to one, respectively, are admixed and reacted in a quartz tube at a temperature of 500° C. for 9 seconds. The evolved off-gas is condensed by cooling to room temperature and is then subjected to fractional distillation. The yield of acetonitrile (B.P. 82° C.) based on the consumed cyanogen chloride is 29%.

Example 3

A mixture of propionic acid and cyanogen chloride in the mol ratio of three to one, respectively, is admixed and reacted in a thermally insulated Pyrex tube at a temperature of 550° C. for a contact time of 10 seconds. The evolved off-gas is cooled to room temperature to condense the same. The resultant liquid mixture is fractionally distilled and propionitrile is recovered. The yield of propionitrile (B.P. 97.1° C.) amounts to 11% based on the cyanogen chloride consumed.

Example 4

A mixture of benzoic acid dissolved in benzene and cyanogen chloride in approximately equimolecular quantities are admixed and heated in a quartz tube at a temperature of 450° C. for a period of 20 seconds. The off-gases issuing from the reactor are collected and condensed. Resultant liquid condensate is subjected to fractional distillation. Benzonitrile (B.P. 190.7° C.) in yields amounting to 18% based on the cyanogen chloride consumed is recovered.

Example 5

A mixture comprising one mol of cyanogen chloride and two mols of phenylacetic acid is dissolved in benzene. The mixture is heated to a temperature of 495° C. for a period of 8 seconds. The off-gases are cooled and condensed. Resultant liquid condensate is subjected to fractional distillation. Phenylacetonitrile (B.P. 204° C.) is recovered therefrom in yields amounting to 27% based on the cyanogen chloride consumed.

We claim:

1. A vapor phase process for preparing nitriles which comprises the steps of: subjecting a mixture of cyanogen chloride and a carboxylic acid compound selected from the group consisting of a lower alkanoic acid, a monocyclic aromatic hydrocarbon acid, a monoaryl lower alkanoic acid and an acid anhydride thereof, to a temperature of at least 400° C. and for a contact time of at least 0.5 second but not more than 60 seconds and recovering the thus-formed nitrile.

2. A vapor phase process for preparing nitriles which comprises the steps of: admixing at least equimolecular quantities of cyanogen chloride and a carboxylic acid compound selected from the group consisting of a lower alkanoic acid, a monocyclic aromatic hydrocarbon acid, a monoaryl lower alkanoic acid, and an acid anhydride thereof, subjecting said mixture to a temperature from about 400°–600° C. and for a contact time of at least 0.5 second but not more than 60 seconds, and recovering the thus-formed nitrile.

3. A process according to claim 2 in which the carboxylic acid compound is acetic acid.

4. A process according to claim 2 in which the carboxylic acid compound is propionic acid.

5. A process according to claim 2 in which the carboxylic acid is benzoic acid.

6. A process according to claim 5 in which the benzoic acid is dissolved in an inert solvent.

7. A process according to claim 5 in which the benzoic acid is dissolved in benzene.

8. A process according to claim 2 in which the carboxylic acid is phenylacetic acid.

9. A process according to claim 2 in which the carboxylic acid anhydride is acetic acid anhydride.

References Cited in the file of this patent

Zappi et al.: 42 C.A., 7704 (1948).